Feb. 19, 1946.  R. J. VEDOVELL  2,395,359
SEAL
Filed March 10, 1942  3 Sheets-Sheet 1
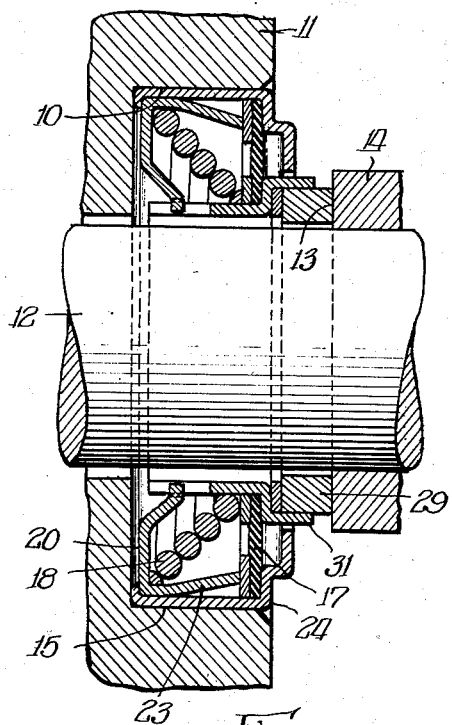
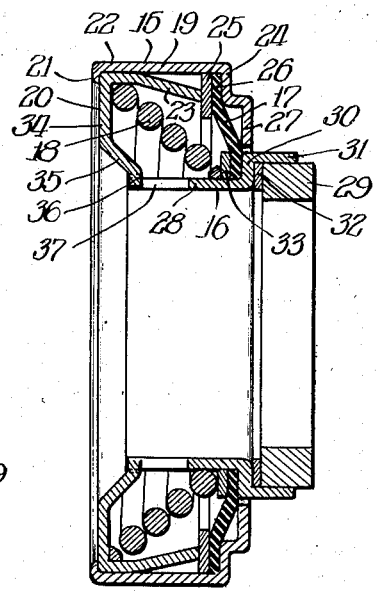
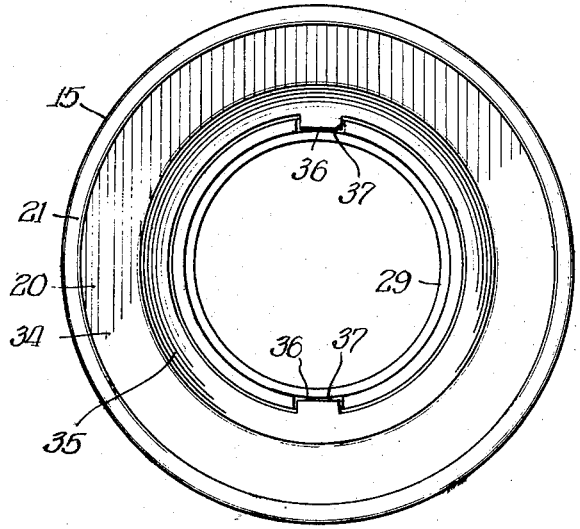
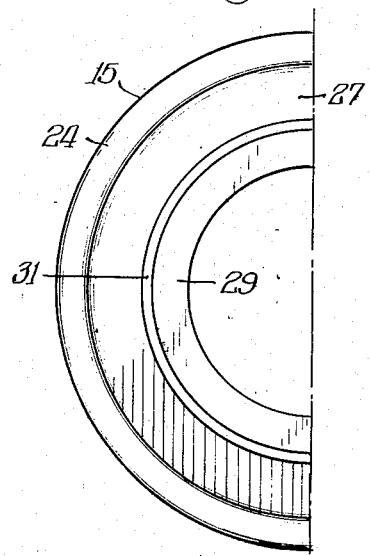
INVENTOR.
Rudolph J. Vedovell,
BY Cromwell, Greist & Warden
ATTYS.

Feb. 19, 1946. R. J. VEDOVELL 2,395,359
SEAL
Filed March 10, 1942 3 Sheets-Sheet 2

INVENTOR.
Rudolph J. Vedovell,
BY Cromwell, Greist + Warden
ATTORNEYS.

Feb. 19, 1946.    R. J. VEDOVELL    2,395,359
SEAL
Filed March 10, 1942    3 Sheets-Sheet 3

INVENTOR.
Rudolph J. Vedovell,
BY Cromwell, Greist + Warden
ATTORNEYS.

Patented Feb. 19, 1946

2,395,359

UNITED STATES PATENT OFFICE 2,395,359

SEAL

Rudolph J. Vedovell, Kenilworth, Ill., assignor to Chicago Rawhide Manufacturing Company, Chicago, Ill., a corporation of Illinois Application March 10, 1942, Serial No. 434,107

8 Claims. (Cl. 288—3)

This invention relates to oil seals of the end-thrust type, in which an annular sealing lip is adapted to bear under spring pressure against a relatively rotatable portion of some associated machine part.

The principal object of the invention is to provide an end-thrust seal of improved construction which will operate efficiently and can be manufactured cheaply.

Other objects and advantages of the invention will be apparent to those skilled in the art upon a full understanding of the novel seal structure.

A preferred embodiment of the invention and two alternative embodiments are presented herein by way of illustration, but it will of course be appreciated that the invention is capable of being incorporated in still other structurally modified forms coming equally within the scope of the appended claims.

In the accompanying drawings:

Fig. 1 is a diametric section through an end-thrust seal constructed in accordance with the invention, showing the seal installed about a shaft between two relatively rotatable machine parts;

Fig. 2 is a similar section through the seal, before installation;

Fig. 3 is a face view of the rear end of the seal;

Fig. 4 is a face view of the front end of the seal;

Figure 5:
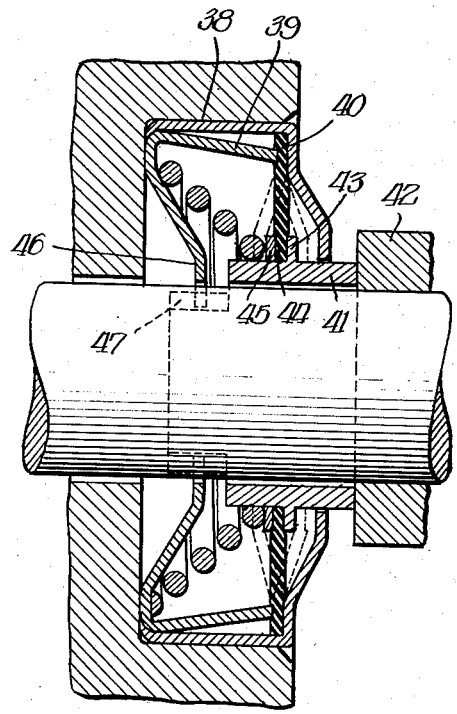
Figure 6:
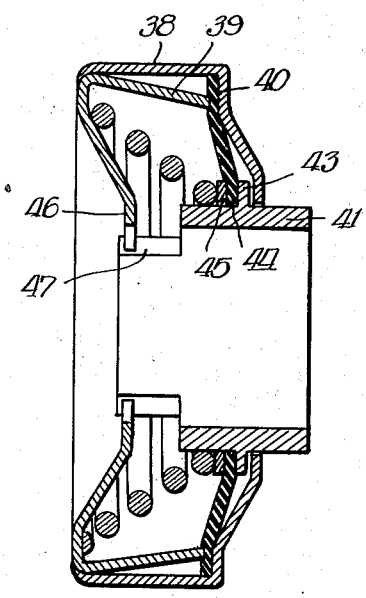
Figure 7:
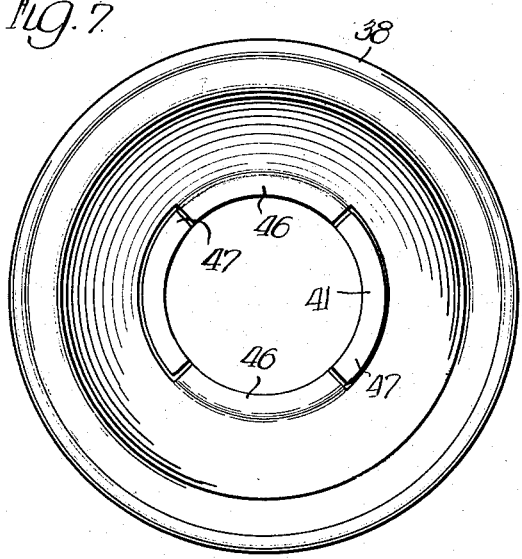
Figure 8:
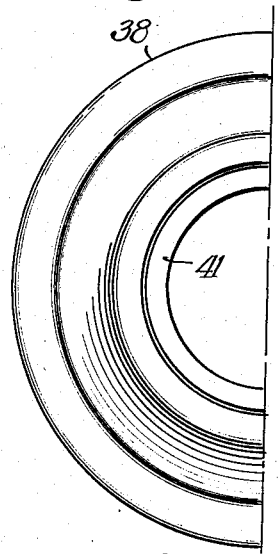
Figure 9:
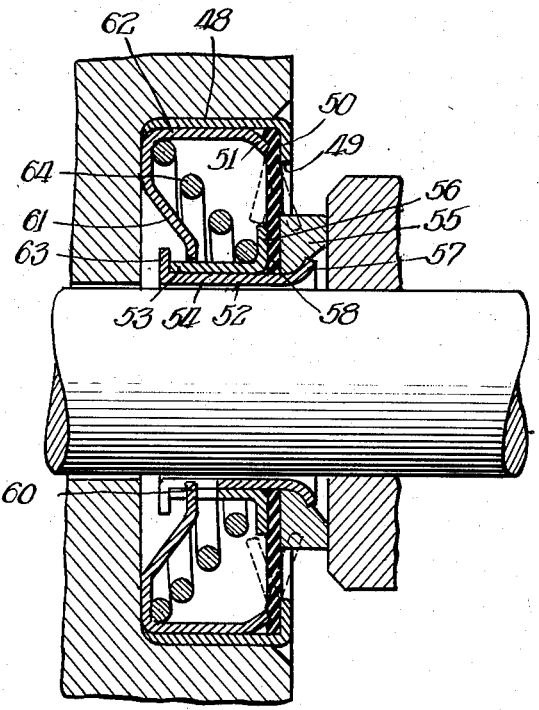
Figure 10:
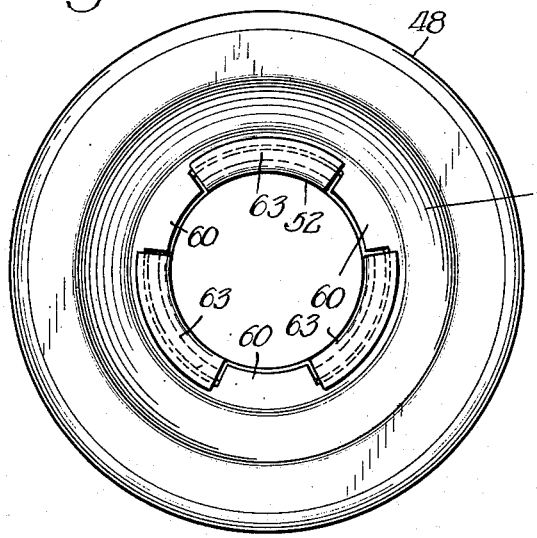
Figure 11:
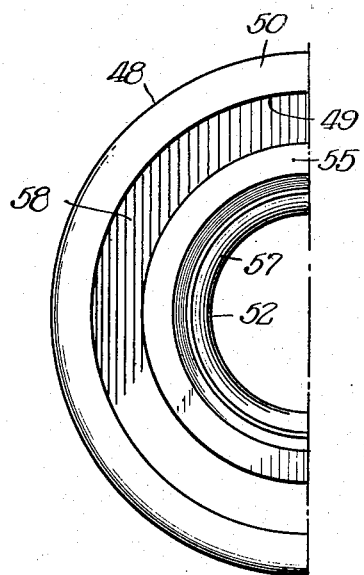

Figs. 5 to 8 inclusive correspond respectively to Figs. 1 to 4 inclusive but show a modified form of the invention; and Figs. 9 to 11 inclusive correspond respectively to Figs. 1, 3 and 4, but show another modification.

The seal shown in Figs. 1 to 4 inclusive will first be described. As will be evident from Fig. 1, the seal is a self-contained unit which is adapted to be press fitted into a bore 10 in a housing 11, about a shaft 12, in sealed association at its front end with the opposed face 13 of a member 14 on the shaft. The seal consists of an outer portion 15, an inner portion 16, a centrally apertured connecting disk 17 of synthetic rubber or other soft flexible imperforate material, and an expansion spring 18.

The outer portion 15 of the seal is of sheet metal construction. It is a double-cup structure, and includes a centrally apertured outer cup 19 and a centrally apertured inner cup 20. The inner cup 20 is held within the outer cup 19 by an inturned edge 21 on the rim 22 of the outer cup. The rim 23 of the inner cup is inturned at a small angle and adjacent the bottom 24 of the outer cup engages with a pressure distributing washer 25. The outer periphery 26 of the diaphragm 17 is clamped between the bottom 24 of the outer cup and the washer 25. The bottom 24 of the outer cup is provided, inwardly of the point where the diaphragm is clamped against the same, with an axially offset portion 27 which affords clearance for the diaphragm in flexing and at the same time limits the axial movement of the inner portion 16.

The inner portion 16 of the seal is for the most part of sheet metal construction and comprises a tube 28 and a sealing ring 29. The tube 28 is provided at its front end with an outwardly extending flange 30 which terminates in a short axially extending flange 31. The sealing ring 29, which may be of a self-lubricated bearing material, or bronze, carbon or other suitable anti-friction material, is press fitted into the socket formed in the front end of the tube 28 by the outwardly and axially extending flanges 30 and 31. A small washer 32 of synthetic rubber or other suitable packing material may be advantageously positioned in the bottom of the socket behind the sealing ring 29. The inner periphery of the diaphragm 17 is securely clamped between the flange 30 and a washer 33 of about the same size which is press fitted or otherwise fixedly positioned on the outside of the tube 28.

The spring 18 is of conical formation and is compressed between the bottom 34 of the inner cup 20 and the washer 33 on the tube 28. The large diameter end of the spring is of substantially the same size as the base of the rim 23 of the inner cup, while the small diameter end of the spring is of substantially the same size as the tube 28.

The bottom 34 of the inner cup 20 is provided, adjacent the centrally located aperture therein, with an axially offset portion 35, preferably of conical formation. This portion 35 is offset in the direction in which the spring 18 extends and is provided at the aperture with a pair of diametrically opposed tongues 36, which tongues are relatively narrow and extend inwardly into circumferentially interlocked engagement with a corresponding number of axially extending slots 37 in the edge of the tube 28.

The above described seal construction provides an effective seal which can be produced at low cost and which can also be produced in extremely minute sizes, if desired.

In the seal shown in Figs. 5 to 8 inclusive, the outer portion 38 of the seal is again a double-cup structure but includes no pressure distributing washer between the edge of the rim 39 of the inner cup and the outer periphery 40 of the diaphragm. The edge of the rim 39 in this case engages directly with the material of the diaphragm. In this modification the inner portion of the seal is a one-piece tubular member 41 which carries no separate sealing ring but bears directly at its front end against the part 42 to be sealed. The member 41 is made in its entirety of a suitable anti-friction material. The member 41 is provided intermediate its ends with a small radial flange 43, and the inner periphery 44 of the diaphragm is clamped against this flange by a washer 45 which is press fitted onto the member 41 behind the flange 43. Tongues 46 on the bottom 47 of the inner cup extend inwardly into circumferentially interlocked association with the sides of the slots 47 in the rear end of the member 41.

In the modification shown in Figs. 9 to 11 inclusive, the outer portion 48 of the seal is quite similar to the outer portion of the seal shown in the last described embodiment, but the aperture 49 in the bottom 50 of the outer cup is almost as large as the rim 51 of the inner cup, with the result that the bottom 50 does not provide any abutment for limiting the axial movement of the inner portion 52. The inner portion 52 is composed of two tubular members 53 and 54 and a sealing ring 55. The member 53 is telescoped over the member 54 and the sealing ring 55 is clamped between a flange 56 on the front end of the member 53 and an opposed flange 57 on the front end of the member 54. The inner periphery 58 of the diaphragm is clamped between the flange 56 and the rear face of the sealing ring 55. Slots 59 are provided in the rear ends of the members 53 and 54 for the reception of inwardly extending tongues 60 on the bottom 61 of the inner cup 62, and the rear edge 63 of the member 54, which is turned outwardly to clamp the member 53 in place, is extended outwardly beyond the surface of the member 53 for engagement with the bottom 61 of the inner cup 62, whereby to limit the extent to which the inner portion 52 of the seal may be projected axially by the action of the compressed spring 64 before installation of the seal.

I claim:

1. In an end-thrust seal for installation as a unit between relatively rotatable parts, a centrally apertured cup, a second centrally apertured cup inversely nested within the first, means connecting said cups to one another to constitute an outer double cup structure fixedly engageable with one of said parts, a thin flexible diaphragm clamped at its outer periphery between the bottom of the first cup and the rim of the second, a rigid axially movable inner sealing portion which is connected with the inner periphery of the diaphragm and projects through the aperture in the bottom of the first cup and is engageable with the other of said parts, and a spring which urges the inner portion axially with respect to the outer double-cup structure and is positioned under compression between the inner portion and the bottom of the second cup.

2. In an end-thrust seal for installation as a unit between relatively rotatable parts, a centrally apertured cup, a second centrally apertured cup inversely nested within the first, means connecting said cups to one another to constitute an outer double cup structure fixedly engageable with one of said parts, a thin flexible diaphragm clamped at its outer periphery between the bottom of the first cup and the rim of the second, a rigid axially movable inner sealing portion which is connected with the inner periphery of the diaphragm and projects through the aperture in the bottom of the first cup and is engageable with the other of said parts, a spring which urges the inner portion axially with respect to the outer double-cup structure and is positioned under compression between the inner portion and the bottom of the second cup, and means restraining relative rotation of said inner portion and said structure.

3. In an end-thrust seal for installation as a unit between relatively rotatable parts, a centrally apertured cup, a second centrally apertured cup inversely nested within the first, means connecting said cups to one another to constitute an outer double cup structure fixedly engageable with one of said parts, said second cup being provided with an inturned rim, a thin flexible diaphragm clamped at its outer periphery between the bottom of the first cup and the inturned rim of the second, a rigid axially movable inner sealing portion which is connected with the inner periphery of the diaphragm and projects through the aperture in the bottom of the first cup and is engageable with the other of said parts, and a spring which urges the inner portion axially with respect to the outer double-cup structure and is positioned under compression between the inner portion and the bottom of the second cup.

4. In an end-thrust seal for installation as a unit between relatively rotatable parts, a centrally apertured cup, a second centrally apertured cup inversely nested within the first, a thin flexible diaphragm clamped at its outer periphery between the bottom of the first cup and the rim of the second, the bottom of the first cup inwardly of the point where the diaphragm is clamped being offset axially to provide clearance for the diaphragm in flexing, a rigid axially movable inner sealing portion which is connected with the inner periphery of the diaphragm and projects through the aperture in the bottom of the first cup, and a spring which urges the inner portion axially with respect to the outer double-cup structure and is positioned under compression between the inner portion and the bottom of the second cup, said axially offset portion of the bottom of the first cup engaging with the diaphragm to limit the spring actuated projection of the inner portion.

5. In an end-thrust seal, an outer portion, an inner portion, a diaphragm connecting said portions, and a spring for urging the inner portion axially with respect to the outer portion, said outer portion including a centrally apertured cup against the bottom of which the spring is compressed, the spring being of conical form with the larger end of the same in engagement with the bottom of the cup, and the bottom of the cup inwardly of the spring being offset axially in the direction in which the inner portion is urged by the spring, the bottom of the cup being provided at the aperture therein with a plurality of relatively narrow inwardly extending tongues, and the inner portion being provided adjacent its rear end with a corresponding number of axially extending slots in circumferentially interlocked engagement with said tongues, which slots interlock with the tongues in the operating as well as the fully projected position of the inner portion, with the rear end of the inner portion disposed wholly within the contour of the bottom of the cup in said operating position.

6. In an end-thrust seal, a centrally apertured cup, a second centrally apertured cup inversely nested within the first, a thin flexible diaphragm clamped at its outer periphery between the bottom of the first cup and the rim of the second, an inner sealing portion which is connected with the inner periphery of the diaphragm and projects through the aperture in the bottom of the first cup, a spring which urges the inner portion axially with respect to the outer double-cup structure and is positioned under compression between the inner portion and the bottom of the second cup, and means carried by the bottom of the second cup inwardly of the spring in engagement with the inner portion of the seal for preventing the latter from rotating relative to the second cup.

7. In an end-thrust seal, a centrally apertured cup, a second centrally apertured cup inversely nested within the first, a thin flexible diaphragm clamped at its outer periphery between the bottom of the first cup and the rim of the second, an inner sealing portion which is connected with the inner periphery of the diaphragm and projects through the aperture in the bottom of the first cup, a spring which urges the inner portion axially with respect to the outer double-cup structure and is positioned under compression between the inner portion and the bottom of the second cup, and inwardly extending projections on the bottom of the second cup about the aperture therein, said inner portion being provided with recesses into which said projections extend in circumferentially interlocked engagement with the sides of the recesses.

8. In an end-thrust seal, an outer portion, an inner portion, a diaphragm connecting said portions, and a spring for urging the inner portion axially with respect to the outer portion, said outer portion including a centrally apertured cup against the bottom of which the spring is compressed, and the bottom of the cup inwardly of the spring being offset axially in the direction in which the inner portion is urged by the spring and being provided at the aperture therein with a plurality of inwardly extending tongues, and the inner portion being provided adjacent its rear end with a corresponding number of axially extending slots in circumferentially interlocked engagement with said tongues, which slots interlock with the tongues in the operating as well as the fully projected position of the inner portion, with the rear end of the inner portion disposed wholly within the contour of the bottom of the cup in said operating position.

RUDOLPH J. VEDOVELL.